United States Patent [19]

Kume et al.

[11] Patent Number: 6,072,762
[45] Date of Patent: Jun. 6, 2000

[54] OPTICAL DISK RECORDING/ REPRODUCING METHOD AND APPARATUS FOR PREVENTING WAVE LENGTH SHIFT DURING RECORDING AND REPRODUCING OPERATIONS

[75] Inventors: Masahiro Kume, Shiga; Yuzaburo Ban, Osaka; Isao Kidoguchi; Satoshi Kamiyama, both of Hyogo; Ayumu Tsujimura, Osaka; Akihiko Ishibashi, Osaka; Yoshiaki Hasegawa, Osaka; Ryoko Miyanaga, Nara, all of Japan

[73] Assignee: Matsushita Electric Industrial Co., Ltd., Osaka, Japan

[21] Appl. No.: 09/289,984

[22] Filed: Apr. 13, 1999

[30] Foreign Application Priority Data

Apr. 24, 1998 [JP] Japan ............................... 10-114661

[51] Int. Cl.[7] .................................................. G11B 7/125
[52] U.S. Cl. ........................ 369/116; 369/44.37; 369/118
[58] Field of Search ................................ 369/112, 118, 369/116, 121, 110, 44.37, 44.36, 44.41; 372/20, 31, 32; 349/1, 22, 86, 139, 171

[56] References Cited

U.S. PATENT DOCUMENTS 5,319,481  6/1994  Fergason ................................ 349/171
5,349,175  9/1994  Prikryl .................................. 369/44.36
5,606,541  2/1997  Finkelstein et al. ..................... 369/112
5,754,571  5/1998  Endoh et al. ............................ 372/20
5,790,433  8/1998  Barenboim et al. ..................... 360/135

FOREIGN PATENT DOCUMENTS 0 615 232 A1  9/1994  European Pat. Off. .

OTHER PUBLICATIONS

Patent Abstracts of Japan, vol. 018, No. 074 (P–1688), Feb. 7, 1994, JP 05 282699, Published Oct. 29, 1993.
Patent Abstracts of Japan, vol. 018, No. 522 (P–1808), Sep. 30, 1994, JP 06 180851, Published Jun. 28, 1994.

Primary Examiner—Tan Dinh
Assistant Examiner—Kim-Kwok Chu
Attorney, Agent, or Firm—Eric J. Robinson; Nixon Peabody LLP

[57] ABSTRACT

Between a semiconductor laser diode and an optical disk, a collimator lens for collimating a laser beam output from the semiconductor laser diode, a liquid crystal optical shutter for attenuating the collimated beam having passed through the collimator lens, and a beam splitter for splitting reflected light from the optical disk are disposed. In addition, a collective lens for collecting the collimated beam obtained by the collimator lens on a data holding surface of the optical disk is further disposed.

6 Claims, 3 Drawing Sheets

OPTICAL DISK RECORDING/REPRODUCING METHOD AND APPARATUS FOR PREVENTING WAVE LENGTH SHIFT DURING RECORDING AND REPRODUCING OPERATIONS

BACKGROUND OF THE INVENTION

The present invention relates to a recording/reproducing method of recording data at a high density in and reproducing recorded data from an optical recording medium by collecting a laser beam on the medium, and an optical disk recording/reproducing apparatus for realizing the recording/reproducing method.

In an optical recording medium such as a phase change (PC) disk and a magneto-optical (MO) disk, the medium heated is heated by narrowing down a laser beam thereon to diffraction limit so that minute marks carrying information can be recorded as change of the reflectance or the magnetization of the medium. In this case, the spot size of the laser beam obtained in diffraction limit is in proportion to the wavelength ($\lambda$) of the laser beam. Therefore, it is effective to decrease the wavelength of the laser beam in order to increase the recording density.

At present, a phase change disk with a diameter of 12 cm where 650 Mbyte of data can be recorded or reproduced by using an AlGaAs semiconductor laser diode with a wavelength of 780 nm and a magneto-optical disk with a diameter of 3.5 inches where 230 Mbyte of data can be recorded or reproduced by using a semiconductor laser diode with a wavelength of 780 nm are practically used.

In order to further increase the recording capacity, a system using an AlGaInP semiconductor laser diode showing laser action at a shorter wavelength of 635 through 680 nm has been developed. A magneto-optical disk having a diameter of 3.5 inches and a recording capacity of 650 Mbyte and using a semiconductor laser diode with a wavelength of 680 nm has been first put to practical use. Furthermore, a DVD-RAM disk with a diameter of 12 cm capable of recording/reproducing 2.6 Gbytes of data by using a semiconductor laser diode with a wavelength of 650 nm is to be put to practical use. Various examinations and studies are now being made for further increasing the storage capacity to 4.7 Gbytes.

On the other hand, a semiconductor laser diode with a shorter wavelength is also under development. Continuous laser action with a blue-green laser beam at a wavelength of 510 nm obtained by using a ZnSe semiconductor laser diode and continuous laser action with a violet laser beam at a wavelength of 410 nm obtained by using a GaN semiconductor laser diode have been reported. Accordingly, if a violet laser beam can be used, 15 Gbytes of data can be recorded on a disk with a diameter of 12 cm, resulting in realizing an optical disk system capable of recording/reproducing high quality images replaceable with a VTR system.

Now, a conventional optical disk recording/reproducing apparatus will be described with reference to an accompanying drawing. FIG. 3 is a schematic diagram of an optical pickup unit of the conventional optical disk recording/reproducing apparatus. As is shown in FIG. 3, a laser beam output from a semiconductor laser diode 51 is collimated by a collimator lens 52, and the collimated laser beam is collected to diffraction limit on a data holding surface of an optical disk 54 by a collective lens 53. At this point, the temperature of a portion of the data holding surface (recording medium) where the laser beam is collected is increased, so as to cause a phase change between crystal and amorphous. In a phase change optical disk, information is recorded in accordance with a change of reflectance of the laser beam derived from this phase change. On the other hand, in a magneto-optical disk, magnetization is once erased by increasing the temperature to a Curie point or more, and a magnetic field is applied while the medium is being cooled, so as to record information in accordance with a direction of magnetization in the recording medium. In this case, information is read (reproduced) by using the Kerr effect that the polarization direction of light is changed in accordance with a direction of magnetization in a substance.

In a reproducing operation, recorded information is read by introducing a laser beam reflected by the optical disk 54 toward a photodetector 56 by a beam splitter 55.

Now, description will be given on wavelength shift where the wavelength of the laser beam output from the semiconductor laser diode 51 is shifted.

In recording data in the optical disk 54, in order to increase the temperature of the recording medium, the semiconductor laser diode 51 is required to have an output power of approximately 30 mW through 50 mW immediately after the output and approximately 10 mW through 20 mW on the optical disk 54. On the other hand, in reproducing recorded data, the necessary output power is approximately 1 mW through 3 mW, and a larger output power can destroy or erase the recorded data. Accordingly, the semiconductor laser diode 51 should conduct continuous laser action with a low output power in a reproducing operation and should conduct modulation action having a high output power and modulated by a recording signal in a recording operation. Thus, the semiconductor laser diode 51 is operated with a low output power in reproducing the optical disk 54 while it is required of a recording operation with a high output power. As a result, it is necessary to increase a driving current for the semiconductor laser diode 51 in a recording operation. Since an optical output power is increased in accordance with increase of a current at a ratio of approximately 0.5 mW/mA, a difference in the current value between a recording operation and a reproducing operation is as large as 50 mA.

On the other hand, the semiconductor laser diode 51 generally includes an optical resonator (Fabry-Perot cavity) having parallel mirror surface edges and formed in an optical semiconductor material such as AlGaAs and InGaP, so as to show laser action at a wavelength which satisfies resonating conditions of the resonator and is in the vicinity of a wavelength attaining a maximum optical gain of the material. The wavelength attaining the maximum optical gain accords with an energy gap Eg of the optical semiconductor material, but the energy gap Eg is changed in accordance with a temperature. Specifically, the energy gap Eg is decreased as the temperature is increased. Therefore, as the temperature is increased, the wavelength at which the semiconductor laser diode 51 shows laser action is increased at a ratio of approximately 0.3 nm/°C.

In this manner, when the temperature of the semiconductor laser diode 51 is increased due to the current increase from a reproducing operation to a recording operation, the wavelength for showing the laser action is unavoidably increased. This phenomenon is designated as the wavelength shift ($\Delta\lambda$). The wavelength shift can be varied depending upon the ambient temperature and a heat radiation state of the semiconductor laser diode 51, and generally has an amplitude of approximately 2 nm through 3 nm.

The present inventors have found that the wavelength shift causes defocus (focal shift) of the laser beam on the optical disk 54.

The collimator lens 52 and the collective lens 53 included in the optical pickup unit shown in FIG. 3 are made from glass or plastic, and the refractive index of such a lens material is generally varied depending upon a wavelength. On the other hand, the focal length of a lens is varied depending upon the refractive index of the lens. As a result, when the wavelength is varied, the focal length is varied. This phenomenon is designated as chromatic aberration of a lens.

FIG. 4 shows an example of the change (in $\mu$m/nm) of the focal length against change of a wavelength in a lens with a focal length of 3.3 mm. In general, as the wavelength is shorter, the chromatic aberration is larger. In the example shown in FIG. 4, it is understood that the chromatic aberration observed at a wavelength of 400 nm is substantially three times as large as the chromatic aberration observed at a wavelength of 650 nm.

In reproducing data from the optical disk 54, the position of the collective lens 53 is finely adjusted in the optical axis direction so that the laser beam of FIG. 3 can be always focused on the optical disk 54. This operation is designated as focus servo. The light reflected by the optical disk 54 is introduced toward the photodetector 56 by the beam splitter 55, so that the focus servo can be conducted on the basis of a signal detected by the photodetector 56. In this servo operation, since the collective lens 53 with large inertial mass is driven, a response speed of approximately 0.1 ms is necessary. However, when the wavelength of the semiconductor laser diode 51 is changed by the current increase in a recording operation and the chromatic aberration of the lens is caused, the position of the focal point of the laser beam on the optical disk 54 is changed in the optical axis direction. Accordingly, the laser beam is defocused in a recording operation, resulting in increasing the spot size. This is because the focus servo cannot follow the change since a switching time between a reproducing operation and a recording operation is as short as approximately 1 $\mu$s. In this case, it is difficult to conduct high density recording.

As described so far, when the wavelength shift becomes large, defocus is ultimately caused. Therefore, the semiconductor laser diode 51 is manufactured so as to minimize the wavelength shift, and the wavelength shift actually allowed in a DVD-RAM using a semiconductor laser diode with a wavelength of 650 nm is approximately 3 nm at maximum.

However, the present inventors have found that the wavelength shift allowed at a wavelength of 400 nm is 1 nm or less. In this case, in a semiconductor laser diode including a Fabry-Perot cavity, it is very difficult to suppress the wavelength shift to be 1 nm or less even when the temperature of the semiconductor laser diode is retained at a predetermined temperature or lower.

SUMMARY OF THE INVENTION

An object of the invention is preventing defocus of a laser beam even when data are recorded in or reproduced from an optical disk by using a semiconductor laser diode with a short wavelength of 400 nm or less.

The present inventors paid attention to the following cause of the wavelength shift: In an optical disk recording/reproducing apparatus, the value of a current flowing through a semiconductor laser diode is largely varied between a reproducing operation and a recording operation. This variation of the current value leads to a higher temperature of the semiconductor laser diode in a recording operation than in a reproducing operation, resulting in causing the wavelength shift.

Accordingly, in order to achieve the object of the invention, the output value of a beam output from the semiconductor laser diode in a reproducing operation is made substantially equal to the average output value of a beam used in a recording operation, so as to substantially equalize the temperature of the semiconductor laser diode in a reproducing operation and a recording operation. Furthermore, in a reproducing operation, the laser beam is attenuated after the output so as to retain recorded data.

Specifically, the recording/reproducing method for an optical disk of this invention comprises the steps of recording desired information in the optical disk by collecting a first laser beam output from lasing means on the optical disk; and reproducing information recorded in the optical disk by using a second laser beam output from the lasing means, and an output value of the first laser beam accords with an output value of the second laser beam for preventing wavelength shift from being caused between the first laser beam and the second laser beam, and the information recorded in the optical disk is reproduced by collecting, on the optical disk, a third laser beam obtained by attenuating the second laser beam.

According to the optical disk recording/reproducing method of this invention, in order to prevent the wavelength shift from being caused between the first laser beam used in a recording operation and the second laser beam used in a reproducing operation, the output values of the first laser beam and the second laser beam output from the lasing means accord with each other. Moreover, in a reproducing operation, the third laser beam obtained by attenuating the second laser beam output from the lasing means is used to irradiate the optical disk, and hence, data recorded in the optical disk can be prevented from being destroyed. Also, since the output value of the beam used in a reproducing operation is larger than in the conventional technique, the lasing operation of the lasing means can be stabilized, resulting in lowering a noise level.

In the recording/reproducing method for an optical disk, the output value of the second laser beam is preferably substantially equal to an average of the output value of the first laser beam. In this manner, even when the first laser beam itself used in a recording operation is data modulated, the wavelength shift can be definitely prevented by making the average output value of the first laser beam substantially accord with the output value of the second laser beam used in a reproducing operation.

In the recording/reproducing method for an optical disk, the third laser beam is preferably obtained by transmitting the second laser beam through an optical shutter including liquid crystal. In this manner, the optical shutter including liquid crystal can electrically and rapidly change the attenuating ratio for the laser beam, and hence, the third laser beam can be definitely obtained from the second laser beam in a reproducing operation.

In the recording/reproducing method for an optical disk, the lasing means is preferably a semiconductor laser diode for outputting a red laser beam with a wavelength of a 600 nm band or a semiconductor laser diode for outputting a blue-violet laser beam with a wavelength of a 400 nm band. In this manner, the recording density of an optical disk using a short wavelength can be increased.

Alternatively, the optical disk recording/reproducing apparatus of this invention comprises lasing means for outputting a first laser beam to an optical disk in a recording operation and a second laser beam, having an output value substantially equal to an output value of the first laser beam, to the optical disk in a reproducing operation; and attenuating means disposed between the optical disk and the lasing means for attenuating an intensity of the second laser beam.

According to the optical disk recording/reproducing apparatus of this invention, the lasing means outputs the first laser beam to the optical disk in a recording operation and outputs the second laser beam, having an output value substantially the same as that of the first laser beam, to the optical disk in a reproducing operation. Therefore, the temperature of the lasing means is substantially the same in a recording operation and a reproducing operation, and hence, the wavelength shift can be prevented. As a result, defocus derived from the wavelength shift can be avoided. Moreover, since the recording/reproducing apparatus comprises the attenuating means for attenuating the intensity of the second laser beam in a reproducing operation, data recorded in the optical disk can be prevented from being destroyed.

In the optical disk recording/reproducing apparatus, the attenuating means is preferably an optical shutter including liquid crystal.

In the optical disk recording/reproducing apparatus, the lasing means is preferably a semiconductor laser diode for outputting a red laser beam with a wavelength of a 600 nm band or a semiconductor laser diode for outputting a blue-violet laser beam with a wavelength of a 400 nm band.

DETAILED DESCRIPTION OF THE INVENTION

Now, a preferred embodiment of the invention will be described with reference to the accompanying drawings.

Figure 1:
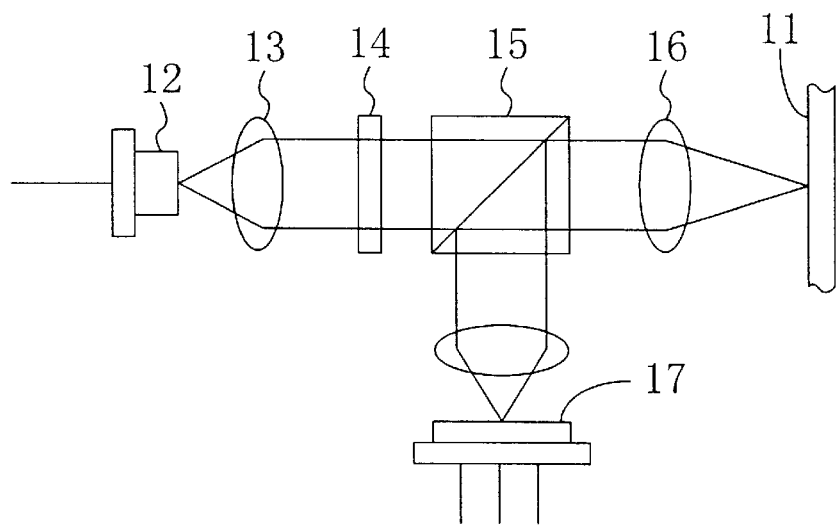
FIG. 1 is a schematic diagram of an optical pickup unit of an optical disk recording/reproducing apparatus according to an embodiment of the invention.

FIG. 1 is a schematic diagram of an optical pickup unit of an optical disk recording/reproducing apparatus according to the embodiment of the invention. In this embodiment, a phase change optical disk apparatus including an optical system with a comparatively simple structure will be exemplified. As is shown in FIG. 1, a semiconductor laser diode 12 for outputting a recording or reproducing laser beam is disposed so as to oppose a data holding surface of an optical disk 11. Between the semiconductor laser diode 12 and the optical disk 11, a collimator lens 13 for collimating the laser beam output from the semiconductor laser diode 12, a liquid crystal optical shutter 14 for attenuating the collimated beam having passed through the collimator lens 13, a beam splitter 15 for splitting reflected light from the optical disk 11, and a collective lens 16 for collecting the collimated beam obtained by the collimator lens 13 on the data holding surface of the optical disk 11 are disposed in this order in a direction from the semiconductor laser diode 12 toward the optical disk 11. Also, the optical pickup unit further includes a photodetector 17 for detecting a read signal and an optical signal used for a servo operation obtained in the reflected light from the optical disk 11 split by the beam splitter 15.

The liquid crystal optical shutter 14 changes its transmittance of light by utilizing change in alignment of liquid crystal molecules in accordance with change of an applied voltage. The liquid crystal optical shutter 14 can be replaced with an attenuator utilizing an electro-optical effect or an acoustic optical effect.

Now, a recording/reproducing method adopted in the optical recording/reproducing apparatus having the aforementioned structure will be described with reference to the accompanying drawing.

Figure 2:
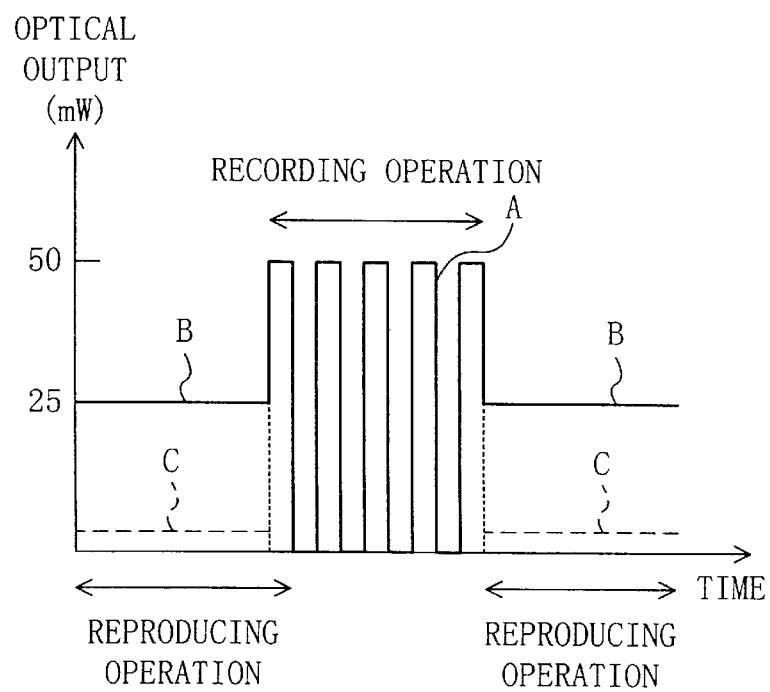
FIG. 2 is a graph for showing an output operation of a semiconductor laser diode in the optical disk recording/reproducing apparatus of the embodiment.

FIG. 2 shows optical outputs in respective operations of the semiconductor laser diode 12 of the optical disk recording/reproducing apparatus of this embodiment.

As is shown in FIG. 2, in a recording operation, for example, the transmittance of the liquid crystal optical shutter 14 is set at a maximum value, and the semiconductor laser diode 12 is allowed to output a recording optical pulse (first laser beam) A as a recording signal having an optical output value modulated in a range between 0 mW and 50 mW with a second laser beam B, used in a reproducing operation, having an optical output value of 25 mW as a center value, so that the recording optical pulse can be collected on the data holding surface of the optical disk 11. At this point, when the recording optical pulse is assumed to have a duty ratio of 50% on the average, the average of the output value of the first laser beam A output from the semiconductor laser diode 12 is 25 mW.

Next as is shown in FIG. 2, in a reproducing operation, for example, the transmittance of the liquid crystal optical shutter 14 is set at 10%, and the semiconductor laser diode 12 is allowed to conduct continuous laser action to output the second laser beam B with an optical output value of 25 mW, so as to obtain a third laser beam C, that is, reproducing light obtained by passing through the liquid crystal optical shutter 14. When the liquid crystal optical shutter 14 is set to have transmittance of approximately 10%, data recorded in the optical disk 11 can be read without being destroyed. Also, since the laser beam output from the semiconductor laser diode 12 is linearly polarization, the transmittance can be definitely controlled by appropriately combining the polarization direction of the laser beam and the alignment direction of the liquid crystal molecules under voltage application.

At this point, when a high data value "1" and a low data value "0" used in a recording operation are not equal but biased, namely, when the duty ratio is not 50%, the wavelength shift can be more precisely suppressed by adjusting the optical output value adopted in a reproducing operation by using a product of a peak output value and a duty ratio. In this case, also in a reproducing operation, it is necessary to adjust the transmittance of the optical attenuator such as the liquid crystal optical shutter 14 so as to change the optical output value of the laser beam collected on the optical disk 11.

In this manner, the output value of the semiconductor laser diode 12 is the same in a recording operation and a reproducing operation in this embodiment. Therefore, the temperature of the semiconductor laser diode 12 is not changed between a reproducing operation and a recording operation, and hence, the occurrence of the wavelength shift can be prevented. Accordingly, since the wavelength shift is thus prevented, the occurrence of defocus in a reproducing operation and a recording operation can be suppressed.

In recording data in the optical disk 11, it is generally necessary to retrieve (search) a predetermined recording area on the optical disk 11, and at this time, the semiconductor laser diode 12 outputs the second laser beam, B the same as that adopted in a reproducing operation. When the predetermined area has been retrieved, the first laser beam A, i.e., the recording optical pulse, is output and a verifying operation is conducted for verifying whether or not predetermined data have been written in the predetermined area. This verifying operation is no more than a reproducing operation, and hence, the second laser beam B is output in the verifying operation. Accordingly, it is necessary to switch over a recording operation to a reproducing operation and vise versa very rapidly.

However, in this embodiment, since the first laser beam A used in a recording operation has the output value substantially the same as the output value of the second laser beam B used in a reproducing operation. Therefore, the defocus derived from the chromatic aberration can be avoided in switching over a recording operation to a reproducing operation and vise versa. As a result, a light spot in diffraction limit can be definitely formed on the data holding surface of the optical disk. The liquid crystal optical shutter 14 using ferroelectric liquid crystal adopted in this embodiment has a response speed of 1 $\mu$s or less, which causes no problem in practical use. If a higher response speed is desired, an optical shutter using an electro-optical effect can be used.

Furthermore, the output power of the semiconductor laser diode 12 in a reproducing operation is equal to the average output power of the semiconductor laser diode 12 in a recording operation in this embodiment. However, these output powers need not be completely equal to each other but can be substantially accord with each other to an extent where the wavelength shift can be avoided.

Also, the wavelength shift can be more definitely prevented by setting the optical output value in a reproducing operation in accordance with the duty ratio of the recording optical pulse. In this case, since data are generally recorded sector by sector in the optical disk 11, the optical output value adopted in a reproducing operation can be set by obtaining, for example, a duty ratio with regard to each sector of data.

Moreover, as the semiconductor laser diode 12, a semiconductor laser diode for outputting a red laser beam with a lasing wavelength of a 600 nm band or outputting a blue-violet laser beam with a lasing wavelength of a 400 nm band can be used. Since the wavelength shift is more serious as the lasing wavelength is shorter as described above, the effect of the invention can be more remarkably exhibited in using a semiconductor laser diode for outputting a blue-violet laser beam. Accordingly, an optical disk apparatus with a high recording density of 15 Gbytes or more can be realized.

Now, another effect of the optical disk recording/reproducing method of this embodiment will be described.

In general, a noise of the laser beam output from the semiconductor laser diode 12 becomes a problem in a reproducing operation. This is because the noise of the laser beam from the semiconductor laser diode 12 is superposed on an optical signal obtained from the reflected light from the optical disk 11, resulting in causing a data read error. Therefore, in order to prevent such a data read error, it is necessary to suppress the relative intensity noise (RIN) of the laser beam to be −130 dB/Hz or less.

Figure 3:
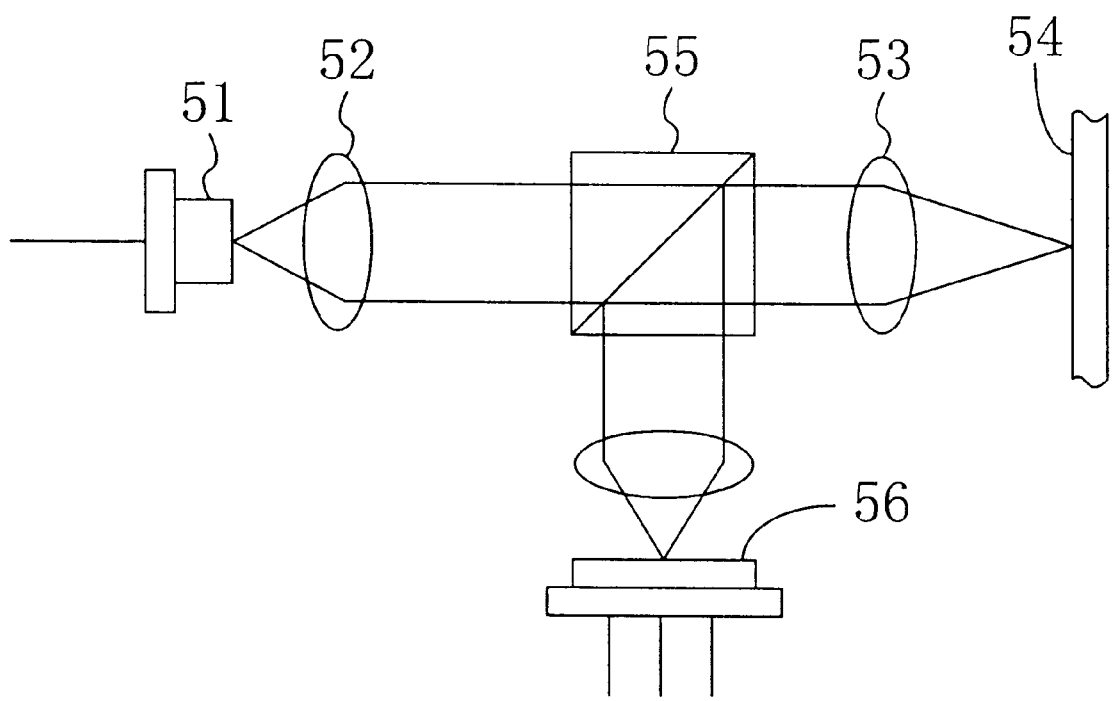
FIG. 3 is a schematic diagram of an optical pickup unit of a conventional optical disk recording/reproducing apparatus.
Figure 4:
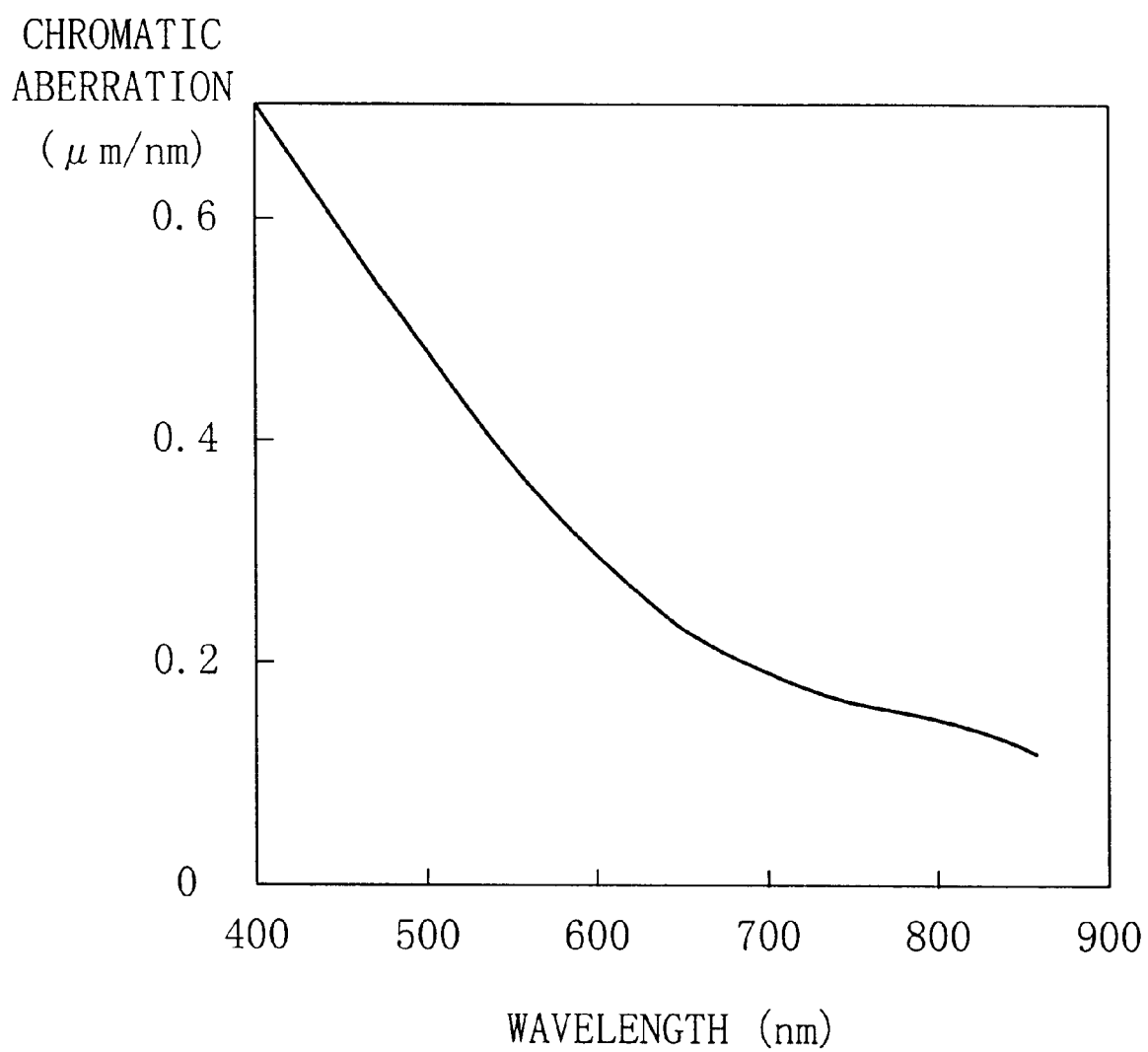
FIG. 4 is a graph for showing change of a focal length against change of a wavelength (i.e., chromatic aberration) in a lens.

In the conventional optical disk recording/reproducing apparatus of FIG. 3, the semiconductor laser diode 51 is allowed to lase with an output value of 1 mW through 3 mW in a reproducing operation, and under this condition, the reflected light from the optical disk 54 passes through the beam splitter 55 and part of the reflected light returns to the semiconductor laser diode 51. Although the quantity of the light returning in this manner is approximately 0.1% through 1%, the lasing state of the semiconductor laser diode 51 can be easily unstabilized during the lasing action with a low output value, and hence, even a small quantity of returning light can cause a noise.

In the conventional apparatus, in order to suppress the noise, the semiconductor laser diode is provided with not a single longitudinal mode but multi longitudinal modes by superposing a high frequency of 500 MHz or more on the output of the semiconductor laser diode. In this manner, the returning light can be less affectable. However, a noise level is higher in the multi longitudinal modes than in the single longitudinal mode. Therefore, it is difficult to attain a low noise level of −140 dB/Hz or less.

In contrast, in this embodiment, since the semiconductor laser diode 12 is operated to have a high output value of 25 mW in a reproducing operation, it can show laser action in the single longitudinal mode. As a result, the noise level can be easily suppressed to be −140 dB/Hz or less.

In addition, when the semiconductor laser diode 12 is operated to have a higher output value than in the conventional apparatus, the lasing action of the semiconductor laser diode 12 itself can be stabilized. Therefore, the returning light can be made less affectable. Moreover, since the liquid crystal optical shutter 14 is disposed on the optical path of the laser beam, the returning light is attenuated by the liquid crystal optical shutter 14. Thus, the noise level of −140 dB/Hz or less can be definitely achieved without superposing a high frequency for attaining the multi modes on the output beam.

Furthermore, as light with a shorter wavelength is used for increasing a recording density of the optical disk 11, the detection sensitivity of the photodetector used at present becomes lower. Therefore, a noise level required of the semiconductor laser diode 12 is further decreased, and a noise level of −140 dB/Hz or less is required in using a laser beam with a lasing wavelength of 400 nm. Accordingly, the recording/reproducing method of this embodiment can exhibit an excellent noise decrease effect also in a high density optical disk using a semiconductor laser diode with a wavelength of 400 nm as a light source.

Although the phase change optical disk is exemplified in the embodiment, the recording/reproducing method is applicable also to a magneto-optical disk.

Specifically, when a magneto-optical disk is used, data "1" and "0" are distinguished by detecting the polarization direction of the reflected light from the magneto-optical disk in a reproducing operation. In a recording operation, a pulse laser beam is collected on the data holding surface of the magneto-optical disk and a magnetic field is applied to the data holding surface by a magnetic head at the same time.

What is claimed is:

1. A recording/reproducing method for an optical disk, which employs lasing means capable of outputting first and second laser beams, said method comprising the steps of:

recording desired information in said optical disk by irradiating an intensity of said first laser beam outputted from said lasing means on said optical disk while modulating said intensity of said first laser beam;

reproducing information recorded in said optical disk by using an intensity of said second laser beam outputted from said lasing means; and setting said respective intensities of said first and second laser beams such that an average of said modulated intensity of said first laser beam is substantially equal to said intensity of said second laser beam for preventing wavelength shift from being caused between said first laser beam and said second laser beam, wherein said step of reproducing information comprises the steps of:
generating a third laser beam by attenuating said intensity of said second laser beam; and
detecting, on said optical disk, an intensity of said third laser beam.

2. The recording/reproducing method of claim 1,
wherein said lasing means is a semiconductor laser diode for outputting a red laser beam with a wavelength of a 600 nm band or a semiconductor laser diode for outputting a blue-violet laser beam with a wavelength of a 400 nm band.

3. The recording/reproducing method of claim 1,
wherein said third laser beam is obtained by transmitting said second laser beam through an optical shutter including liquid crystal.

4. An optical disk recording/reproducing apparatus comprising:

lasing means for outputting a first laser beam having an intensity which is modulated to an optical disk in a recording operation and outputting a second laser beam, having a modulated intensity substantially equal to an average of said intensity of said first laser beam, to said optical disk in a reproducing operation; and attenuating means disposed between said optical disk and said lasing means for attenuating said intensity of said second laser beam.

5. The optical disk recording/reproducing apparatus of claim 4,
wherein said lasing means is a semiconductor laser diode for outputting a red laser beam with a wavelength of a 600 nm band or a semiconductor laser diode for outputting a blue-violet laser beam with a wavelength of a 400 nm band.

6. The optical disk recording/reproducing apparatus of claim 4,
wherein said attenuating means is an optical shutter including liquid crystal.

* * * * *